United States Patent
Kagawa

(10) Patent No.: US 9,481,097 B2
(45) Date of Patent: Nov. 1, 2016

(54) ROBOT AND MAINTENANCE METHOD FOR ROBOT

(71) Applicant: KABUSHIKI KAISHA YASKAWA DENKI, Kitakyushu-shi (JP)

(72) Inventor: Ryuta Kagawa, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/547,139

(22) Filed: Nov. 19, 2014

(65) Prior Publication Data

US 2015/0174770 A1    Jun. 25, 2015

(30) Foreign Application Priority Data

Dec. 20, 2013 (JP) ................................ 2013-263738

(51) Int. Cl.
    *B25J 19/00* (2006.01)

(52) U.S. Cl.
    CPC .......... *B25J 19/0008* (2013.01); *B25J 19/0066* (2013.01); *Y10T 74/20305* (2015.01)

(58) Field of Classification Search
    CPC .............. B25J 19/0008; B25J 19/0012; B25J 19/0015; B25J 19/0058; B25J 19/0066; B25J 19/0095
    USPC ............ 74/490.01, 490.02, 490.05; 192/138, 192/139, 148; 248/558, 645, 357, 911; 414/738, 742; 901/15, 48, 49, 50
    See application file for complete search history.

(56) References Cited

U.S. PATENT DOCUMENTS

| 4,500,251 A | * | 2/1985 | Kiryu | ....................... B25J 9/047 |
| | | | | 248/123.11 |
| 5,402,690 A | * | 4/1995 | Sekiguchi | ............ B25J 19/0016 |
| | | | | 248/280.11 |
| 5,697,757 A | * | 12/1997 | Lindsay | ................ B66F 11/048 |
| | | | | 212/197 |

(Continued)

FOREIGN PATENT DOCUMENTS

| CN | 102601803 | 7/2012 |
| CN | 202292757 U | 7/2012 |

(Continued)

OTHER PUBLICATIONS

English Translation of EP 2163503 A2.*

(Continued)

*Primary Examiner* — David M Fenstermacher
(74) *Attorney, Agent, or Firm* — Mori & Ward, LLP

(57) ABSTRACT

A robot includes a base. A rotation base is coupled to the base and rotatable about a rotation axis relative to the base. An arm includes a base end that is coupled to the rotation base and that is turnable relative to the rotation base about a turning axis that is approximately perpendicular to the rotation axis. A balancer is coupled to the rotation base and the arm to provide force to between the rotation base and the arm. To a first attachment portion, one end of a jig is attachable to restrict displacement of the balancer in an axial direction. The first attachment portion is disposed at a coupling portion where the balancer and the arm are coupled to each other. To second attachment portions, another end of the jig is attachable. The second attachment portions are disposed at a predetermined distance from the rotation base.

10 Claims, 17 Drawing Sheets

(56) References Cited

U.S. PATENT DOCUMENTS

| | | | |
|---|---|---|---|
| 7,546,985 B1* | 6/2009 | Choi | F16L 3/01 248/229.1 |
| 8,200,073 B1* | 6/2012 | Nakamura | A61B 1/00149 248/324 |
| 8,905,699 B2* | 12/2014 | Orgeron | E21B 19/155 212/255 |
| 2003/0066373 A1* | 4/2003 | Maeguchi | B25J 9/1065 74/490.01 |
| 2005/0034551 A1* | 2/2005 | Mantovani | B23Q 1/34 74/490.01 |
| 2012/0067156 A1* | 3/2012 | Chen | B25J 9/106 74/490.01 |
| 2012/0186379 A1 | 7/2012 | Miyamoto | |

FOREIGN PATENT DOCUMENTS

| | | | | |
|---|---|---|---|---|
| DE | EP 2163503 A2 * | 3/2010 | | B25J 19/0012 |
| JP | 08-174469 | 7/1996 | | |
| JP | 2002-283274 | 10/2002 | | |
| JP | 2004-291116 | 10/2004 | | |
| JP | 2011-200989 | 10/2011 | | |

OTHER PUBLICATIONS

Chinese Office Action for corresponding CN Application No. 201410658084.8, Dec. 24, 2015.

Japanese Office Action for corresponding JP Application No. 2013-263738, Nov. 4, 2015.

Extended European Search Report for corresponding EP Application No. 14194012.2-1712, Apr. 15, 2016.

* cited by examiner

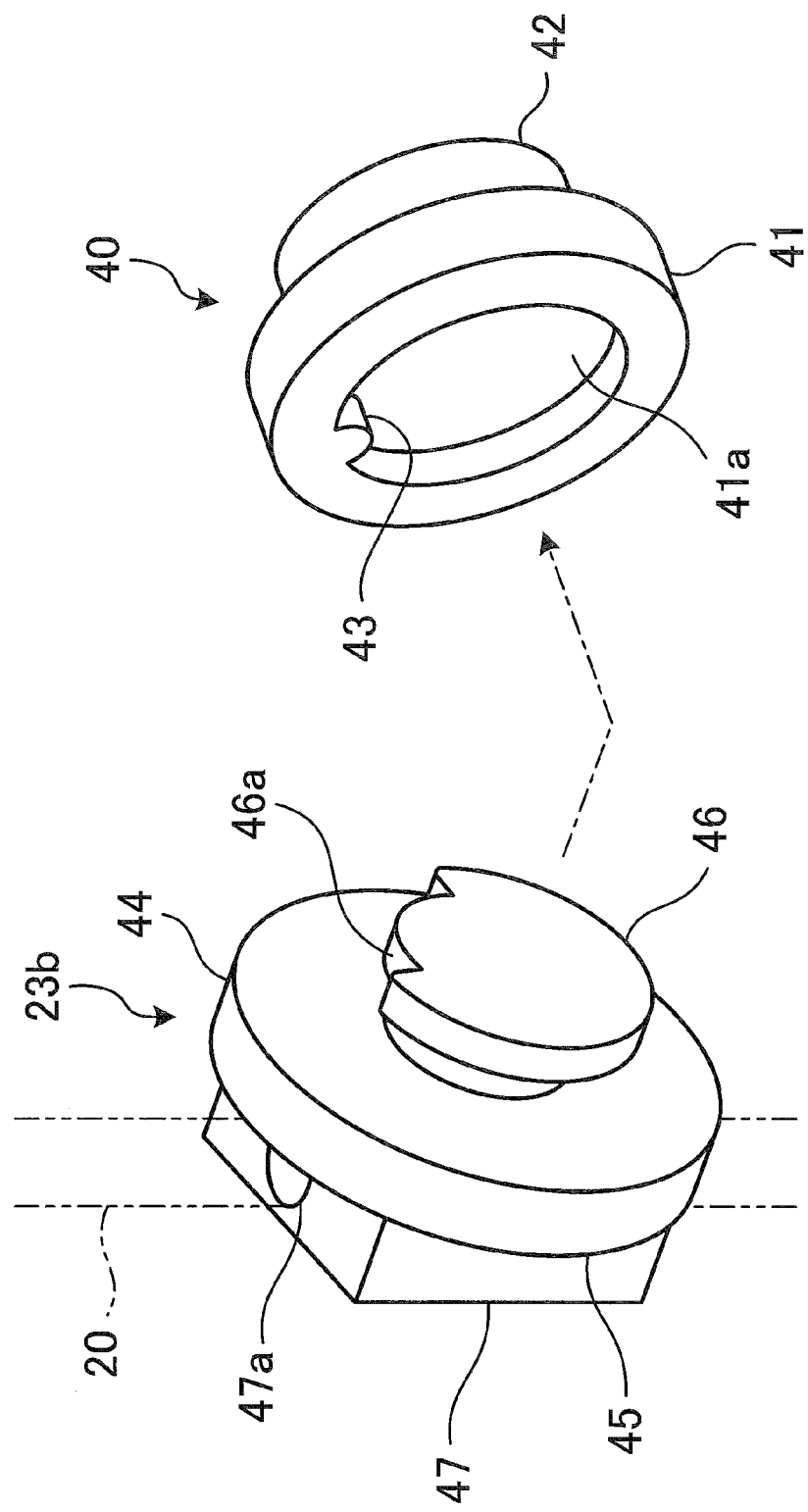

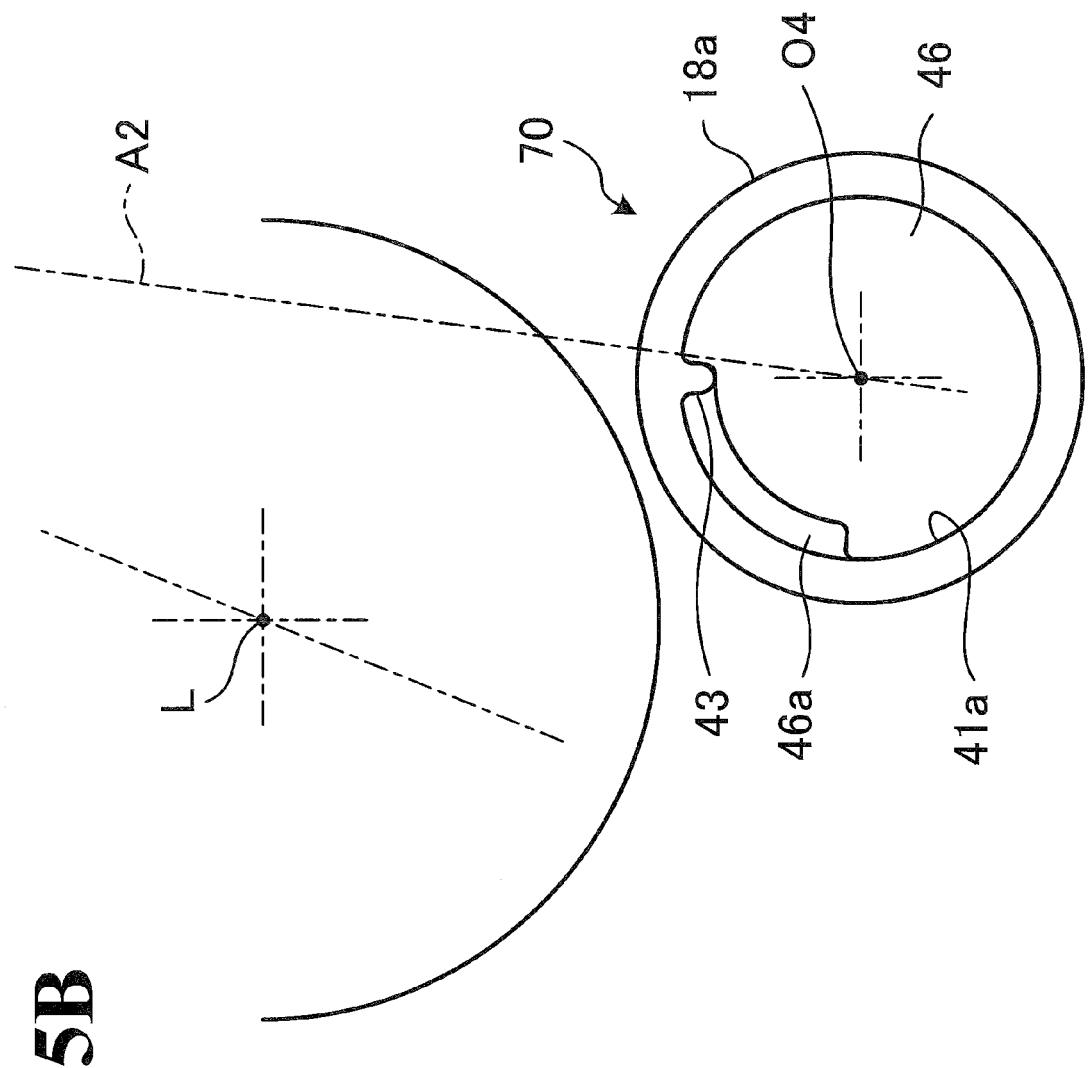

ROBOT AND MAINTENANCE METHOD FOR ROBOT

CROSS-REFERENCE TO RELATED APPLICATIONS

The present application claims priority under 35 U.S.C. §119 to Japanese Patent Application No. 2013-263738, filed Dec. 20, 2013. The contents of this application are incorporated herein by reference in their entirety.

BACKGROUND

1. Field of the Invention

The embodiments disclosed herein relate to a robot and a maintenance method for a robot.

2. Discussion of the Background

Japanese Unexamined Patent Application Publication No. 2011-200989 discloses a robot used for spot welding and other purposes. The robot includes a rotation base and an arm. The rotation base is rotatable approximately horizontally relative to a base fixed on a floor surface or another surface. The arm is turnable in a manner approximately perpendicular to the rotation base. To the rotation base, a gravity-compensation balancer is coupled.

SUMMARY

According to one aspect of the present disclosure, a robot includes a base, a rotation base, an arm, a balancer, a first attachment portion, and a plurality of second attachment portions. The rotation base is coupled to the base and rotatable about a predetermined rotation axis relative to the base. The arm includes a base end that is coupled to the rotation base and that is turnable relative to the rotation base about a turning axis that is approximately perpendicular to the predetermined rotation axis. The balancer is coupled to the rotation base and the arm to provide force to between the rotation base and the arm. To the first attachment portion, one end of a jig is attachable to restrict displacement of the balancer in an axial direction. The first attachment portion is disposed at a coupling portion where the balancer and the arm are coupled to each other. To the plurality of second attachment portions, another end of the jig is attachable. The plurality of second attachment portions are disposed at a predetermined distance from the rotation base.

According to another aspect of the present disclosure, a maintenance method is for a robot. The robot includes a base, a rotation base, an arm, a balancer, a first attachment portion, and a plurality of second attachment portions. The rotation base is coupled to the base and rotatable about a predetermined rotation axis relative to the base. The arm includes a base end that is coupled to the rotation base and that is turnable relative to the rotation base about a turning axis that is approximately perpendicular to the predetermined rotation axis. The balancer is coupled to the rotation base and the arm to provide force to between the rotation base and the arm. To the first attachment portion, one end of a jig is attachable to restrict displacement of the balancer in an axial direction. The first attachment portion is disposed at a coupling portion where the balancer and the arm are coupled to each other. To the plurality of second attachment portions, another end of the jig is attachable. The plurality of second attachment portions are disposed at a predetermined distance from the rotation base. The method includes stopping the arm with the arm taking a predetermined posture. The jig is attached to the first attachment portion and to at least one second attachment portion among the plurality of second attachment portions to which the jig is attachable. A part of the robot is replaced.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 4A is a schematic perspective view of another end of the jig and a second attachment portion;

FIG. 5B is an enlarged view of the second attachment portion illustrated in FIG. 5A;

DESCRIPTION OF THE EMBODIMENTS

A robot and a maintenance method for the robot according to an embodiment will be described in detail below by referring to the accompanying drawings. The following embodiment is provided for exemplary purposes only and is not intended to limit the present disclosure.

Figure 1:
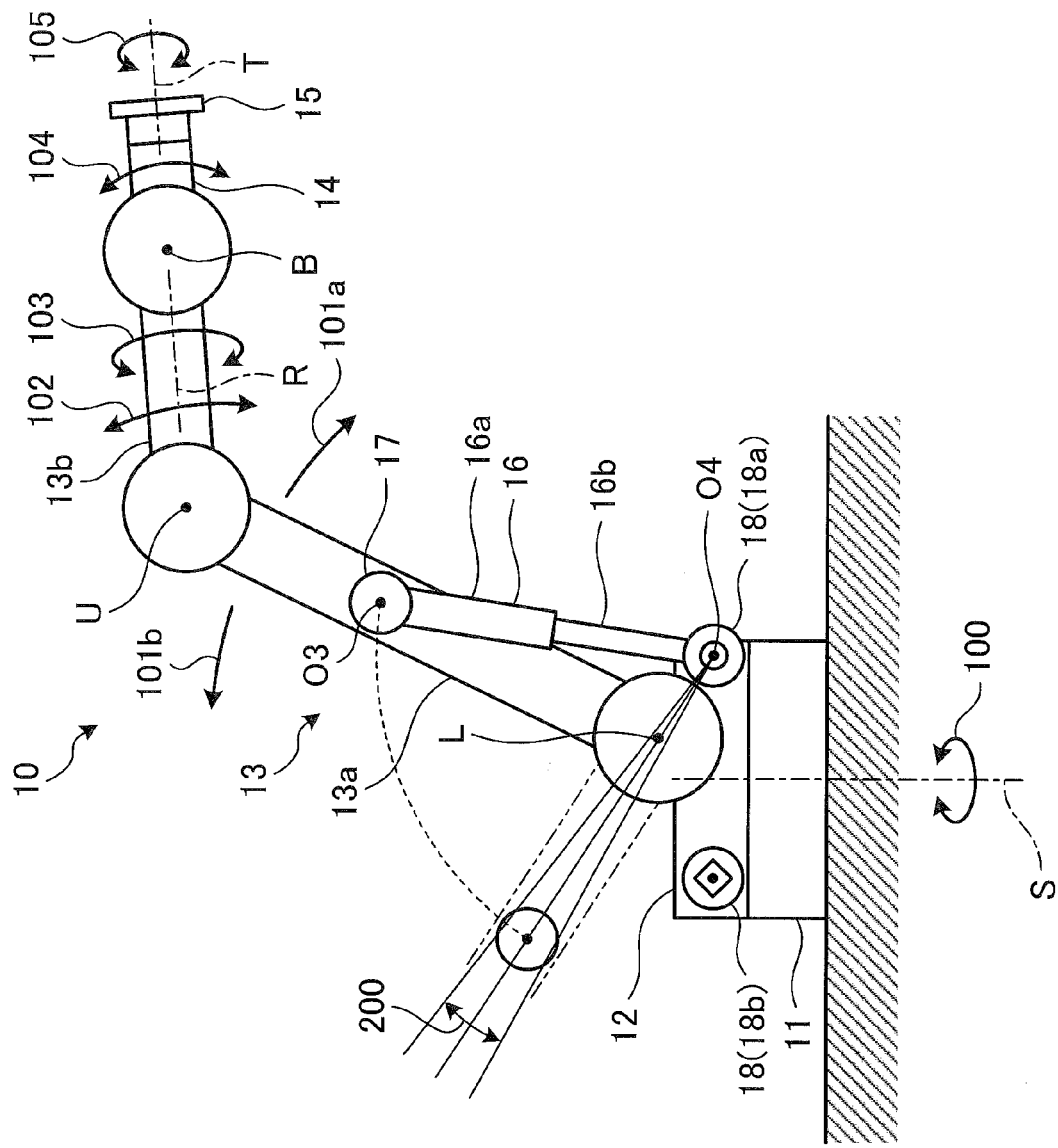
FIG. 1 is a schematic front view of a robot according to an embodiment.

First, by referring to FIG. 1, a configuration of a robot 10 according to this embodiment will be briefly described. FIG. 1 is a schematic front view of the robot 10.

As illustrated in FIG. 1, the robot 10 is what is called a vertical multi-articular robot. The robot 10 includes a base 11, a rotation base 12, an arm 13, a swing portion 14, a flange 15, and a balancer 16.

The base 11 is a support base fixed to a floor surface or another surface. The rotation base 12 is rotatably disposed on the base 11. The arm 13 is rotatable relative to the rotation base 12.

The swing portion 14 is swingable at the distal end of the arm 13. At the distal end of the swing portion 14, the flange 15 is rotatable relative to the swing portion 14.

The robot 10 also includes the balancer 16. The balancer 16 is turnably coupled to the rotation base 12 and the arm 13 to provide tensile force to between the rotation base 12 and the arm 13. While in this embodiment the balancer is of the type that provides tensile force to between the rotation base 12 and the arm 13, any other type of balancer is possible insofar as the balancer utilizes fluid pressure, spring force, or any other form of force to provide axial force of the balancer to the rotation base 12 the arm 13. Another example is to provide compressive force (which is a force in a direction opposite to the direction of tensile force) to the rotation base 12 and the arm 13. In this case, the position to attach the balancer is changed in accordance with characteristics of the balancer.

Incidentally, the robot 10 is attached with a jig to restrict expansion and contraction of the balancer 16 in order to ensure safety of maintenance such as replacement of parts. At one end, the jig is attached to a first attachment portion 17. The first attachment portion 17 is disposed at the arm 13 side of the balancer 16. At another end, the jig is attached to a second attachment portion 18a. The second attachment portion 18a is disposed at the rotation base 12 side of the balancer 16.

However, when the arm 13 stops moving at a predetermined posture, that is, when the robot 10 stops moving at such a posture that the tensile force of the jig is not sufficiently effective for the rotation base 12 and the arm 13, a change can occur in the posture of the arm 13 due to only a slight amount of external force or the weight of the robot 10 itself, even though the robot 10 is attached with the jig. As used herein, an example of the predetermined posture is in the vicinity of a turning range 200. In the turning range 200, a turning axis L, which is the turning center of the arm 13, meets a line connecting between a turning center O3 and a turning center O4 of the balancer 16. The turning center O3 and the turning center O4 are also turning centers of the jig.

In view of this, a second attachment portion 18b is provided in the robot 10 according to this embodiment, in addition to the second attachment portion 18a. As illustrated in FIG. 1, the second attachment portion 18b is disposed at a predetermined distance from the second attachment portion 18a.

Thus, a plurality of second attachment portions 18 are provided. This ensures a choice between the second attachment portions 18 in accordance with the posture of the arm 13. For example, when the arm 13 is in the turning range 200, the second attachment portion 18b is used instead of the second attachment portion 18a to prevent the posture of the arm 13 from changing. This, as a result, ensures safety of the maintenance of the robot 10.

Thus, the robot 10 according to this embodiment is provided with a mechanism to restrict the attachability of the jig to one second attachment portion among the plurality of second attachment portions 18 when the arm 13 is at a predetermined posture. This will be described later by referring to FIGS. 4A, 4B, and other drawings.

In the example illustrated in FIG. 1, two second attachment portions 18 (18a and 18b) are provided. It is also possible to provide equal to or more than three second attachment portions 18 and to attach the jig to one second attachment portion 18 among the equal to or more than three second attachment portions 18. In the case of equal to or more than three second attachment portions 18, it is preferable to restrict the attachability of the jig to one second attachment portion among the equal to or more than three second attachment portions 18 when the arm 13 is at a predetermined posture, similarly to the case of two second attachment portions 18.

The configuration of the robot 10 according to this embodiment will be described in more detail below. As illustrated in FIG. 1, the rotation base 12 is coupled to the base 11 in a manner rotatable about a rotation axis S relative to the base 11. An arrow 100 illustrated in FIG. 1 indicates rotation directions of the rotation base 12.

The arm 13 includes a lower arm 13a and an upper arm 13b. The lower arm 13a has a base end that is coupled to the rotation base 12 in a manner turnable relative to the rotation base 12 about the turning axis L, which is approximately perpendicular to the rotation axis S. Arrows 101a and 101b illustrated in FIG. 1 indicate turning directions of the lower arm 13a. In the following description, the direction in which the arrow 101a is oriented will be referred to as the front of the robot 10, and the direction in which the arrow 101b is oriented will be referred to as the rear of the robot 10, for convenience of description.

FIG. 1 also illustrates the turning center O3 and the turning center O4. The turning center O3 is at the arm 13 side of the balancer 16, and the turning center O4 is at the rotation base 12 side of the balancer 16.

The upper arm 13b has a base end that is coupled to the distal end of the lower arm 13a in a manner turnable relative to the distal end of the lower arm 13a about a turning axis U, which is approximately parallel to the turning axis L. An arrow 102 illustrated in FIG. 1 indicates turning directions of the upper arm 13b.

Also the upper arm 13b is rotatable about a rotation axis R, which is approximately perpendicular to the turning axis U. An arrow 103 illustrated in FIG. 1 indicates rotation directions of the upper arm 13b.

The swing portion 14 is coupled to the distal end of the upper arm 13b in a manner swingable relative to the distal end of the upper arm 13b about a swing axis B, which is approximately perpendicular to the rotation axis R. An arrow 104 illustrated in FIG. 1 indicates swing directions of the swing portion 14.

The flange 15 is coupled to the swing portion 14 in a manner rotatable relative to the swing portion 14 about the rotation axis T, which is approximately perpendicular to the swing axis B. The flange 15 is fittable with an end effector attachment portion, for example. The end effector attachment portion receives an end effector such as a spot welding gun and a workpiece holding mechanism. An arrow 105 illustrated in FIG. 1 indicates rotation directions of the flange 15.

Figure 2A:
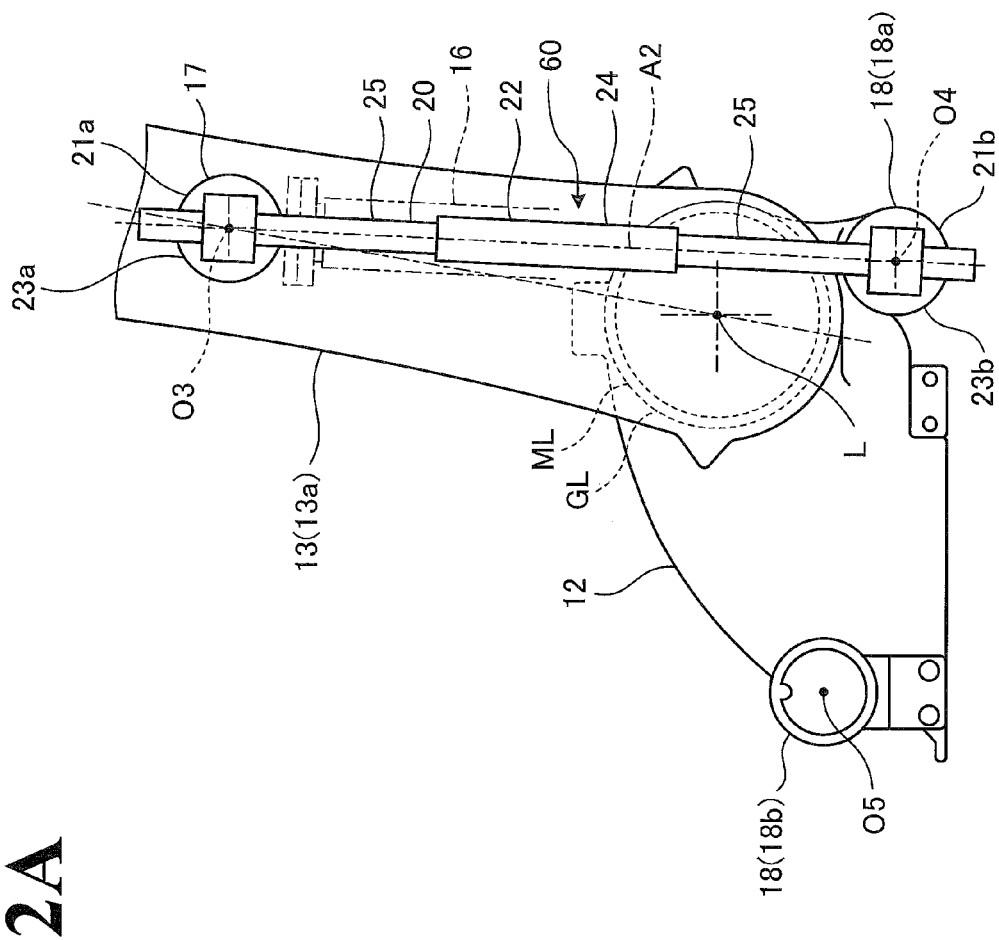
FIG. 2A is a front view of the robot attached with a jig.
Figure 2B:
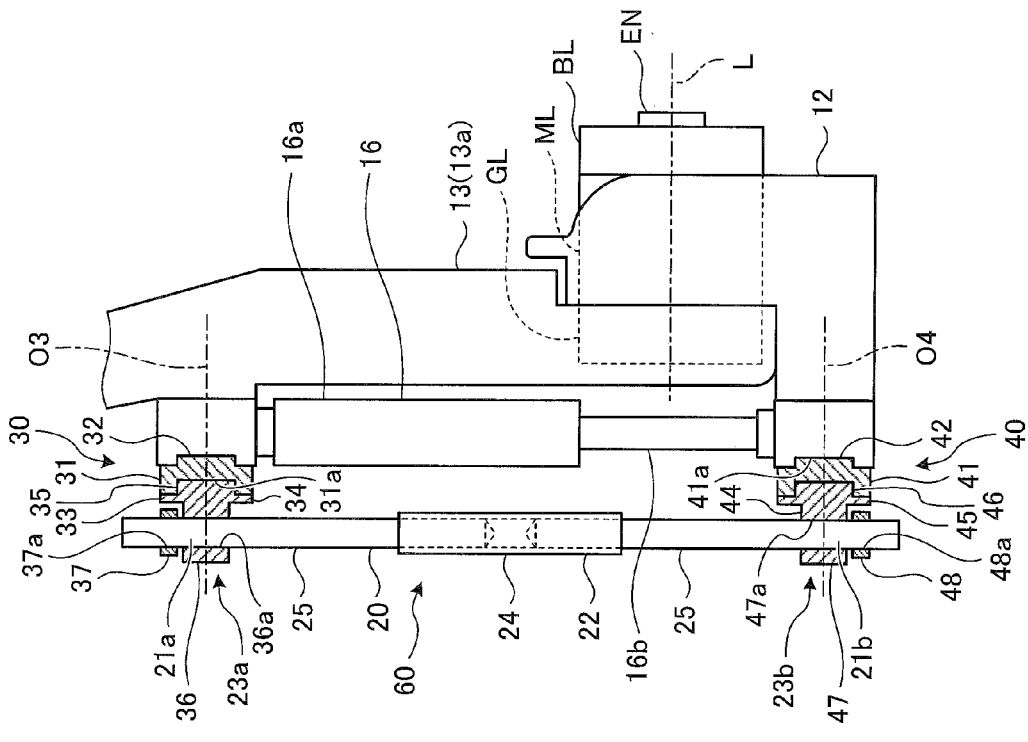
FIG. 2B is a right side view of the robot with the jig attached to the same position as a position illustrated in FIG. 2A.

Each of the rotation axes (the rotation axis S, the turning axis L, the turning axis U, the rotation axis R, the swing axis B, and the rotation axis T) of the robot 10 is attached with a servo motor ML to provide rotational driving force to each axis (see FIG. 2B and other drawings).

The balancer 16 includes a cylinder 16a and a rod 16b. The cylinder 16a is filled with a fluid such as nitrogen gas. The rod 16b expands and contracts by the pressure of the fluid. The cylinder 16a may also be a fluid pressure cylinder filled with any other kinds of gas or liquid such as oil. The balancer 16 may not necessarily use fluid. It is also possible to use a compression spring or a tension spring to provide operation force to the rod 16b.

The balancer 16 is coupled to the rotation base 12 and the lower arm 13a. Specifically, the balancer 16 has the base end side of the cylinder 16a attached to the lower arm 13a, and has the distal end side of the rod 16b attached to the rotation base 12. Thus, the balancer 16 provides a suitable level of tensile force to between the rotation base 12 and the lower arm 13a.

Further, the balancer 16 has an attachment portion at the rotation base 12 side. The attachment portion at the rotation base 12 side is rotatable about a predetermined rotation axis that is approximately parallel to the turning axis L. The balancer 16 has another attachment portion at the lower arm 13a side. The attachment portion at the lower arm 13a side is rotatable about a predetermined rotation axis that is approximately parallel to the turning axis L.

The attachment portion of the balancer 16 at the rotation base 12 is at a position that is apart from the rotation axis S of the rotation base 12 and that is further at the base 11 side than the turning axis L of the lower arm 13a. Specifically, the attachment portion of the balancer 16 at the rotation base 12 is configured such that the base end of the balancer 16 is attached to the rotation base 12 at a further front position of the robot 10 than the rotation base 12.

With the balancer 16 attached in this manner, the base end of the balancer 16 is at a further front position of the robot 10 than the rotation base 12 due to the attachment portion at the rotation base 12. This ensures a wider range of inclination of the lower arm 13a in the rear direction. This is because the balancer 16 provides force to support the lower arm 13a from below when the lower arm 13a is inclined in the rear direction.

This, in turn, improves the degree of freedom of the posture that the robot 10 is able to take at the time of spot welding work and any other kind of work. This also improves compactness in the posture of the robot 10 in view of conveyance of the robot 10; that is, the robot 10 can be folded in a compact manner, reducing its volume at the time of conveyance.

Also with the balancer 16 attached in the above-described manner, the drive system-related mechanisms built in the robot 10, such as servo motor, reducer, and brake, can be reduced in size (and output) as compared with a case without the balancer. This eliminates or minimizes an increase in footprint. Thus, a reduction in footprint facilitates the attempt to save space.

It is noted that the rod 16b of the balancer 16 is covered with a bellows-shaped cover member, not illustrated. The cover member expands and contracts following the expansion and contraction of the rod 16b. This is more effective in welding applications in preventing burning due to a hot strip such as a sputter. The cover member may not necessarily have a bellows shape insofar as the cover member keeps a cylindrical shape in covering the rod 16b.

The robot 10 also includes equipment cables, not illustrated. Examples of the equipment cables include, but are not limited to, welding-related cables and hoses. The equipment cables, for example, are routed outside the balancer 16 along the lower arm 13a while being supported by the balancer 16. Further, the equipped cables are guided to outside the base end of the upper arm 13b and routed toward the distal end of the upper arm 13b.

The robot 10 is attached with a jig, described later, to restrict displacement of the balancer 16 in an axial direction. The robot 10 includes the first attachment portion 17 and the second attachment portion 18. To the first attachment portion 17, one end of the jig is attached. To the second attachment portion 18, another end of the jig is attached.

The first attachment portion 17 is disposed at the coupling portion where the lower arm 13a and the base end of the balancer 16 are coupled to each other. Specifically, the first attachment portion 17 is disposed outside the balancer 16 at the lower arm 13a side and on the rotation axis of the balancer 16 that is at the lower arm 13a side.

The second attachment portion 18 is provided in plural (two in this embodiment, namely, 18a and 18b). The second attachment portions 18a and 18b are disposed on the rotation base 12 at a predetermined distance from each other. One second attachment portion (second attachment portion 18a) among the plurality of second attachment portions 18 is disposed at the coupling portion where the rotation base 12 and the balancer 16 are coupled to each other. Specifically, the second attachment portion 18a is disposed outside the balancer 16 at the rotation base 12 side and on the rotation axis of the balancer 16 that is at the rotation base 12 side.

The other second attachment portion (second attachment portion 18b) among the plurality of second attachment portions 18 is disposed on the rotation base 12 at a predetermined distance from the second attachment portion 18a and in approximately parallel to the second attachment portion 18a.

Next, a jig 20, which is attached to the robot 10 according to this embodiment, will be described by referring to FIGS. 2A and 2B. FIG. 2A is a front view of the robot 10 attached with the jig 20. FIG. 2B is a right side view of the robot 10 with the jig 20 attached at the same position as the position illustrated in FIG. 2A. FIG. 2A illustrates the turning center O3 of the one end 21a of the jig 20 and the turning center O4 (O5) of another end 21b of the jig 20. Also FIG. 2A illustrates an axis line A2 of the jig 20.

As illustrated in FIGS. 2A and 2B, the jig 20 includes a rod-shaped main body 22 and attachment members 23a and 23b. The attachment members 23a and 23b are respectively disposed at ends 21a and 21b of the main body 22.

The main body 22 includes a hollow-cylindrical connection member 24 and two rod members 25. The connection member 24 is threaded on its inner surface. The rod members 25 are each threaded on each outer surface. The rod members 25 are screwed into the connection member 24 from each end of the connection member 24. This configuration makes the jig 20 expandable and contractible in the axial direction, resulting in an adjustor 60 to adjust the length of the jig 20.

The attachment members 23a and 23b are disposed at the ends of one rod made up of the rod members 25 connected together through the connection member 24. That is, the attachment members 23a and 23b are respectively disposed at the one end 21a and the other end 21b of the main body 22. The attachment members 23a and 23b are rotatable relative to the first attachment portion 17 and the second attachment portion 18 in approximately parallel to the lower arm 13a and other elements described above. The attachment members 23a and 23b will be described in more detail later.

The jig 20 is attached to such a predetermined position on the robot 10 that enables the jig 20 to restrict displacement of the balancer 16 in the axial direction if the robot 10 stops moving due to failure or other causes, thereby stabilizing the tensile force between the rotation base 12 and the arm 13. An application and a function of the jig 20 will be described below.

For example, an operator or another worker performs maintenance such as replacing a part when the robot 10 stops moving. In this case, the arm 13 (lower arm 13a) may occasionally stop at a turning angle relative to the rotation base 12. Irrespective of the posture of the lower arm 13a, however, the operator or another worker may occasionally perform work.

Here, points to be noted in the maintenance will be described by referring to specific examples. A kind of robot such as the robot 10 usually includes a servo motor ML to provide driving force that makes the lower arm 13a turn about the turning axis L. The servo motor ML inputs rotational force into a reducer GL, and by the rotation of the reducer GL, the arm 13 (lower arm 13a) rotates about the turning axis L relative to the rotation base 12.

To the servo motor ML, an encoder EN and a brake BL are coupled. The encoder EN detects the rotation position of the servo motor ML. The brake BL provides rotational braking force to the servo motor ML. The brake BL uses its braking force to restrict rotation of the servo motor ML about the turning axis L against force from the weight of the robot 10 and other kinds of force. When the robot 10 stops moving, the brake BL has a function to lock the turning about the turning axis L.

The locking function keeps the lower arm 13a at its stationary posture even though the robot 10 has stopped moving. However, when the servo motor ML is replaced by being disconnected from the turning axis L and removed from the robot 10, the lock against the turning axis L is released. This leaves the lower arm 13a, which has been keeping its stationary posture, into no-load state.

When the lock of the servo motor ML (the brake BL) against the turning axis L is released, the lower arm 13a may, depending on its posture, incline either toward the arm 13 or the balancer 16 when either the weight of the arm 13 or the tensile force of the balancer 16 is greater than the other. That is, there is a possibility of the lower arm 13a falling toward the front or rear of the robot 10. The direction in which the arm 13 falls may be difficult to predict for the operator or another worker.

For purposes including protection against danger, a first thing to do in the removal of the servo motor ML is to restrict displacement of the balancer 16 in the axial direction, thereby stabilizing the tensile force of the balancer 16.

With a spring balancer, one of its ends may be fixed to the inner wall of the rotation base so as to restrict displacement of the balancer in the axial direction. The balancer 16, in contrast, is what is called a gas balancer with the cylinder 16a filled with fluid. This necessitates airtightness for the cylinder 16a. When, for example, the rod 16b, which expands and contracts relative to the cylinder 16a, is gripped directly by a hand in an attempt to fix the balancer 16 in the axial direction, the outer surface of the rod 16b may be damaged. This causes a gap to occur between the rod 16b and the otherwise sealed cylinder 16a, making it difficult to keep the cylinder 16a airtight.

In view of this, the robot 10 according to this embodiment is provided with the first attachment portion 17 and the plurality of second attachment portions 18 (18a and 18b) to restrict displacement of the balancer 16 in the axial direction, as described above. By referring to FIGS. 2A to 4B, configurations of the first attachment portion 17 and the second attachment portions 18a and 18b will be described in detail below.

Figure 3A:
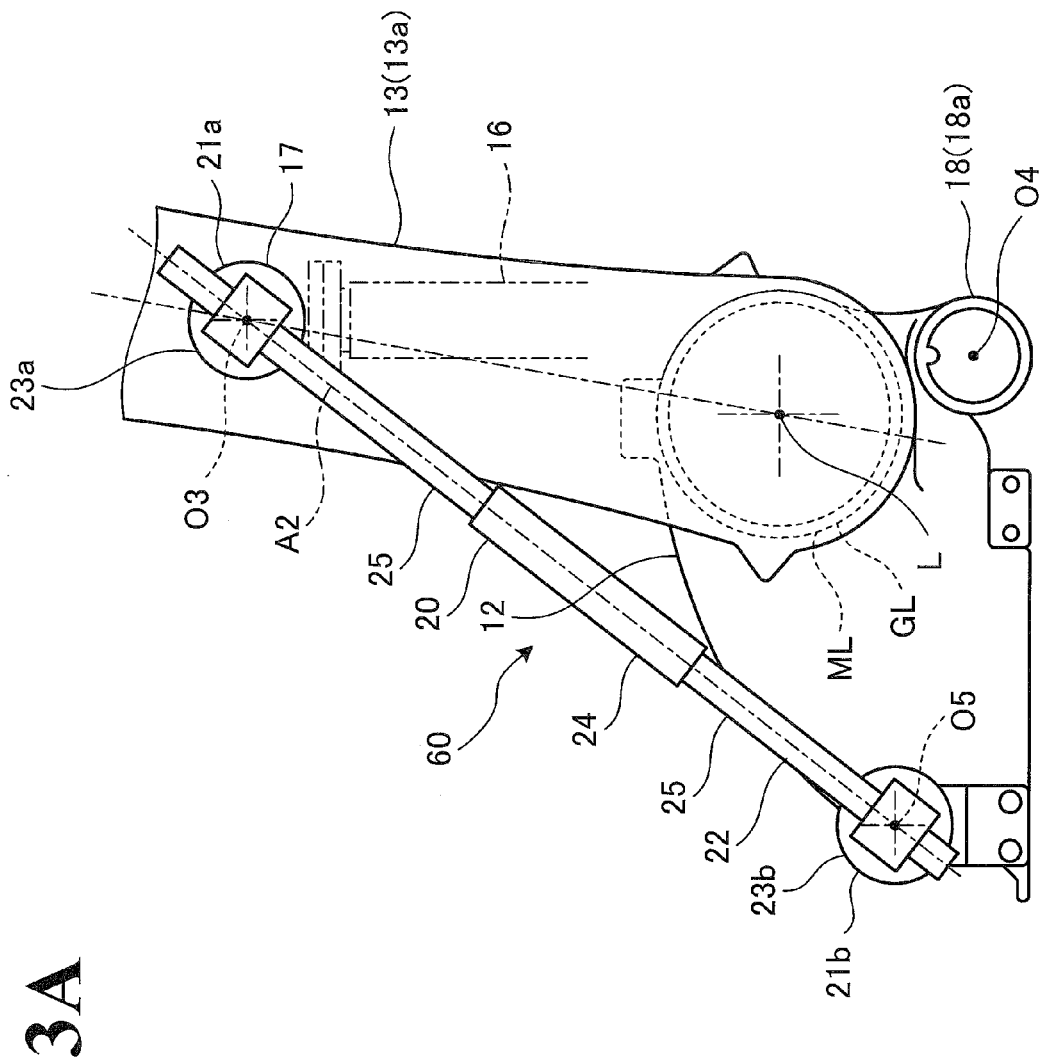
FIG. 3A is a front view of the robot with the jig attached to a position different from the position illustrated in FIG. 2A.
Figure 3B:
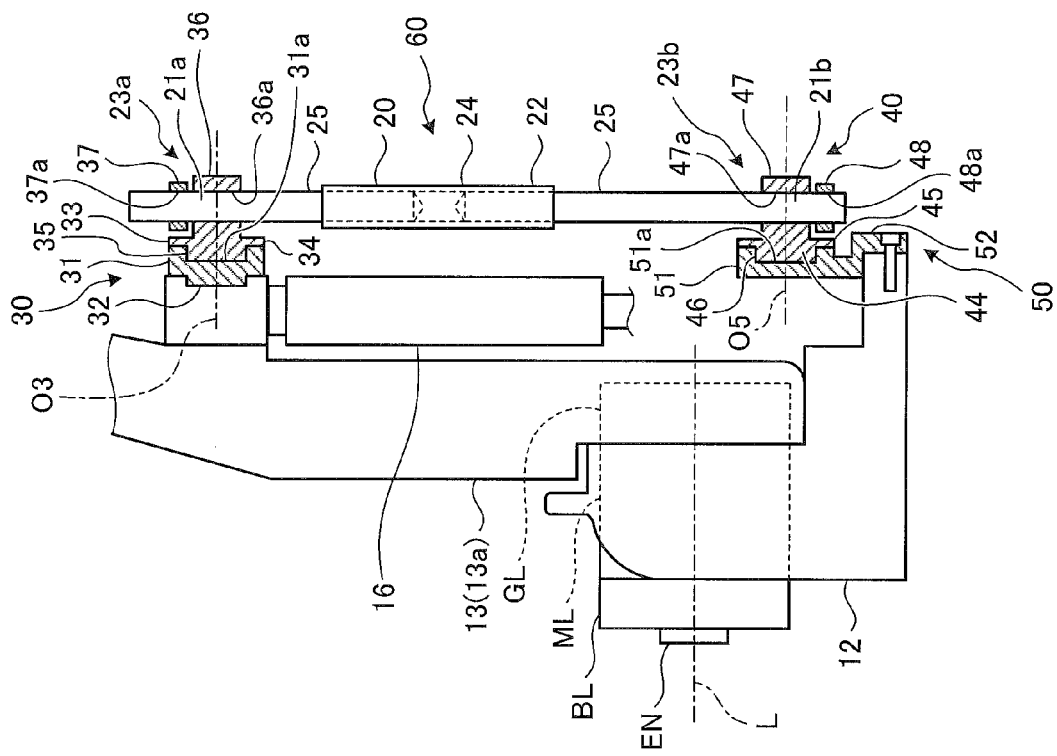
FIG. 3B is a left side view of the robot with the jig attached to the same position as the position illustrated in FIG. 3A.
Figure 4B:
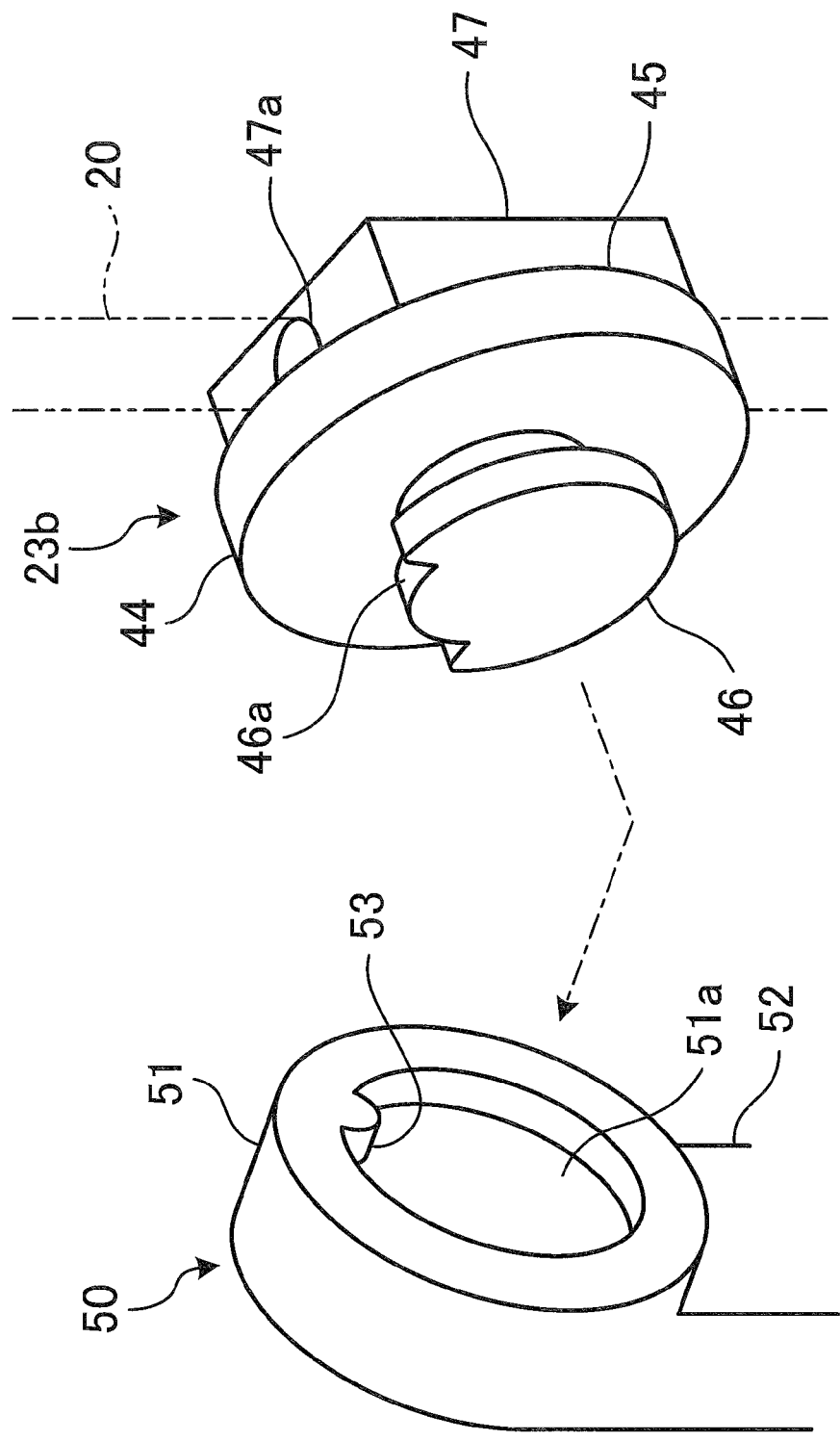
FIG. 4B is a schematic perspective view of the other end of the jig and another second attachment portion.

FIG. 3A is a front view of the robot 10 with the jig 20 attached to a position different from the position illustrated in FIG. 2A. FIG. 3B is a left side view of the robot 10 with the jig 20 attached to the same position as the position illustrated in FIG. 3A. FIG. 4A is a perspective view of the other end 21b of the jig 20 and the second attachment portion 18a. FIG. 4B is a schematic perspective view of the other end 21b of the jig 20 and the other second attachment portion 18b. FIG. 3A illustrates the turning center O3 of the one end 21a of the jig 20 and the turning center O5 (O4) of the other end 21b of the jig 20. Also FIG. 3A illustrates the axis line A2 of the jig 20.

As illustrated in FIGS. 2B and 3B, the first attachment portion 17 includes a receiving member 30. The receiving member 30 includes a receiving portion 31 and a male portion 32. The receiving portion 31 has a short, hollow-cylindrical shape, and includes a circular depression 31a approximately in the center of the receiving portion 31. The male portion 32 has a short, solid-cylindrical shape. The receiving portion 31 is disposed at one side of the male portion 32 and has a larger diameter than the diameter of the male portion 32. An example of the receiving member 30 an integral molded article of metal.

At the one end 21a of the jig 20, the attachment member 23a is disposed. The attachment member 23a is coupled to the receiving member 30. The attachment member 23a includes an engagement portion 33 and a rod holding portion 36. The engagement portion 33 includes a flange 34 and a circular plate shaped protrusion 35. The protrusion 35 is disposed on one surface of the flange 34 and engageable with the depression 31a of the receiving member 30.

The rod holding portion 36 has a rectangular block shape. Approximately in the center of the rod holding portion 36, a through hole 36a is disposed. Through the through hole 36a, the rod member 25 of the jig 20 passes. The through hole 36a is threaded on its inner surface. An example of the attachment member 23a is an integral molded article of metal, similarly to the receiving member 30.

The jig 20 also includes a stopping member 37 at a position further outward than the attachment member 23a. The stopping member 37 has a rectangular block shape and is made of metal or another material. Approximately in the center of the stopping member 37, a hole 37a is disposed. The hole 37a is threaded on its inner surface. The stopping member 37 is attached to the rod holding portion 36 by being screwed on threads formed on the outer surface of the rod holding portion 36.

As illustrated in FIGS. 2B, 3B, and 4A, the second attachment portion 18a includes a receiving member 40. The receiving member 40 includes a receiving portion 41 and a male portion 42. The receiving portion 41 has a short, hollow-cylindrical shape, and includes a circular depression 41a approximately in the center of the receiving portion 41. The male portion 42 has a short solid-cylindrical shape. The receiving portion 41 is disposed at one side of the male portion 42 and has a larger diameter than the diameter of the male portion 42.

In the depression 41a of the receiving portion 41, a protrusion 43 is disposed at a predetermined phase of the depression 41a. Specifically, as illustrated in FIG. 4A, the protrusion 43 protrudes toward the center of the depression 41a at a position on the inner surface of the depression 41a. An example of the receiving member 40 is an integral molded article of metal.

At the other end 21b of the jig 20, the attachment member 23b is disposed. The attachment member 23b is coupled to the receiving member 40. The attachment member 23b includes an engagement portion 44 and a rod holding portion 47. The engagement portion 44 includes a flange 45 and a circular plate shaped protrusion 46. The protrusion 46 is disposed on one surface of the flange 45 and engageable with the depression 41a of the receiving member 40.

The protrusion 46 includes a cutout 46a over a predetermined phase range. Specifically, as illustrated in FIG. 4A, the cutout 46a is disposed at a position on the outer surface of the protrusion 46 to accommodate the protrusion 43 on the depression 41a with the protrusion 46 engaged with the depression 41a. When the protrusion 46 rotates in its planar direction, the protrusion 43 and the cutout 46a restrict the rotation of the protrusion 46 to a predetermined angle. The protrusion 43 and the cutout 46a implement a restricting function of a restrictor, described later.

The rod holding portion 47 has a rectangular block shape. Approximately in the center of the rod holding portion 47, a through hole 47a is disposed. Through the through hole 47a, the rod member 25 of the jig 20 passes. The through hole 47a is threaded on its inner surface. An example of the attachment member 23b is an integral molded article of metal, similarly to the receiving member 40.

The jig 20 also includes a stopping member 48 at a position further outward than the attachment member 23b. The stopping member 48 has a rectangular block shape and is made of metal or another material. Approximately in the center of the stopping member 48, a hole 48a is disposed. The hole 48a is threaded on its inner surface. The stopping member 48 is attached to the rod holding portion 47 by being screwed on threads formed on the outer surface of the rod holding portion 47.

As illustrated in FIGS. 2B, 3B, and 4B, the second attachment portion 18b includes a receiving member 50. The receiving member 50 includes a receiving portion 51 and a fixed portion 52. The receiving portion 51 has a short, hollow-cylindrical shape, and includes a circular depression 51a approximately in the center of the receiving portion 51. The fixed portion 52 has an approximately rectangular and extends to the receiving portion 51. As illustrated in FIG. 3B, the fixed portion 52 extends below the receiving portion 51 and is bent in accordance with the shape of the position at which the rotation base 12 is mounted. The fixed portion 52 is fixed to the rotation base 12 through a bolt or another object.

In the depression 51a of the receiving portion 51, a protrusion 53 is disposed at a predetermined phase of the depression 51a. Specifically, as illustrated in FIG. 4B, the protrusion 53 protrudes toward the center of the depression 51a at a position on the inner surface of the depression 51a. An example of the receiving member 50 is an integral molded article of metal.

As illustrated in FIGS. 2A and 3A, the jig 20 is attached to one second attachment portion among the two second attachment portions 18a and 18b in accordance with the posture of the arm 13. The single jig 20 is used irrespective of whether the jig 20 is attached to the second attachment portion 18a or 18b.

For this reason, the jig 20 includes the adjustor 60 to adjust the length between the one end 21a and the other end 21b in accordance with the distance from the first attachment portion 17 to the second attachment portion 18a and the distance from the first attachment portion 17 to the second attachment portion 18b. As described above, the adjustor 60 is made up of the connection member 24 and the two rod members 25 screwed into the connection member 24, and thus enables the jig 20 to expand and contract.

The two second attachment portions 18a and 18b include a restrictor to restrict attachability of the other end 21b of the jig 20 to one second attachment portion among the two second attachment portions 18a and 18b when the arm 13 is at a predetermined posture.

As the restrictor, the protrusions 43 and 53 are disposed at predetermined positions on surfaces to contact the attachment member 23b at the other end 21b of the jig 20 (that is, the surfaces are on the depressions 41a and 51a respectively of the receiving portions 41 and 51 at the two second attachment portions 18a and 18b). At the jig 20, the cutout 46a is disposed at a predetermined position on a surface to contact the restrictor (that is, the surface is on the protrusion 46 of the attachment member 23b at the other end 21b). Thus, the restrictor uses the protrusions 43 and 53 and the cutout 46a to restrict the attachment of the jig 20.

In this embodiment, the protrusions 43 and 53 are disposed at the restrictor side, and the cutout 46a is disposed at the jig 20 side. Another possible example is that a cutout is disposed at the restrictor side, and a protrusion is disposed at the jig 20 side.

Next, by referring to FIGS. 5A to 8B, description will be made in detail with regard to restriction of attachment of the jig 20 implemented by a restrictor 70. The restrictor 70 has a function to restrict attachability of the other end 21b of the jig 20 to one second attachment portion among the two second attachment portions 18a and 18b when the arm 13 is at a predetermined posture.

Figure 5A:
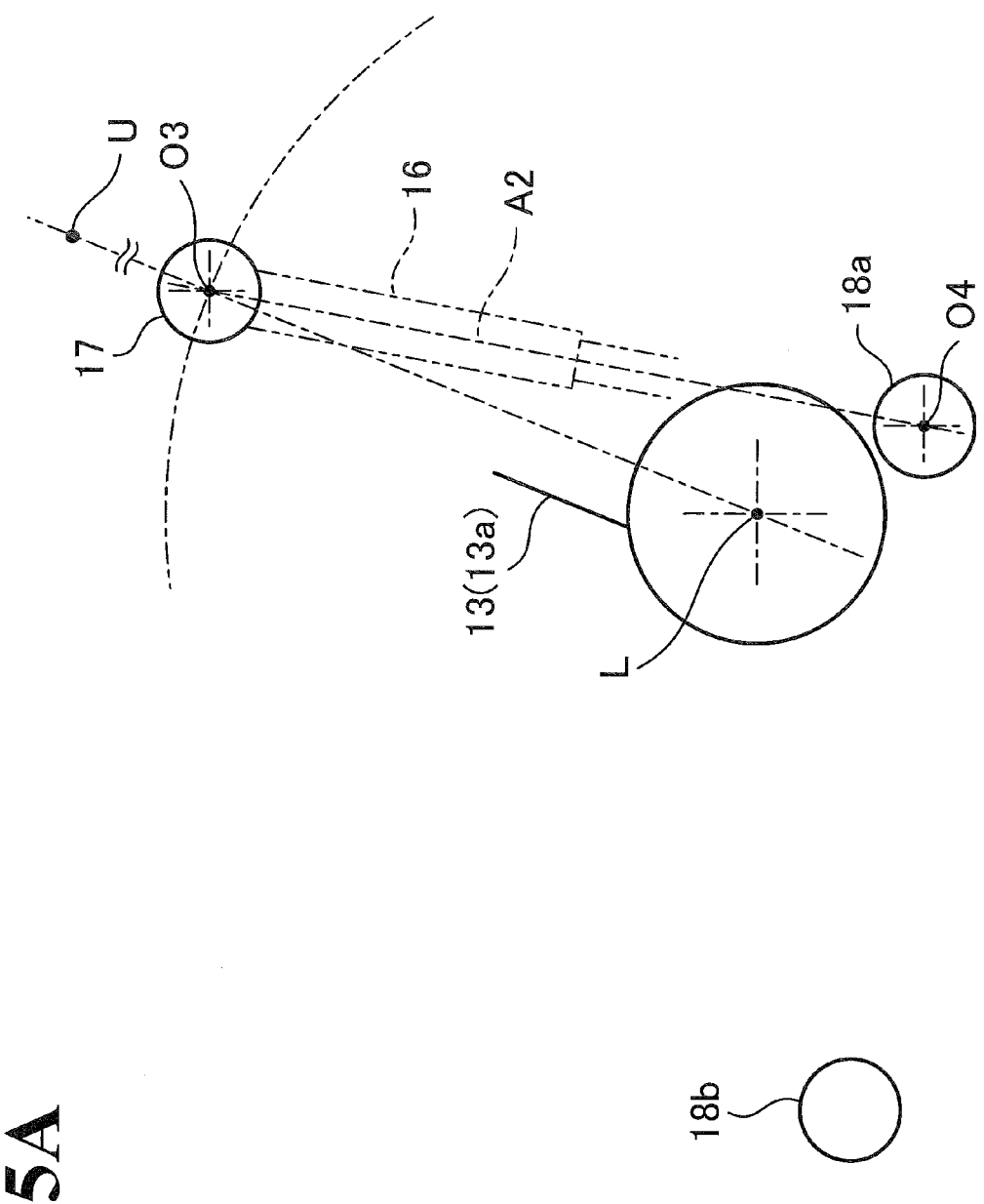
FIG. 5A illustrates a case where the jig is operating properly.
Figure 6A:
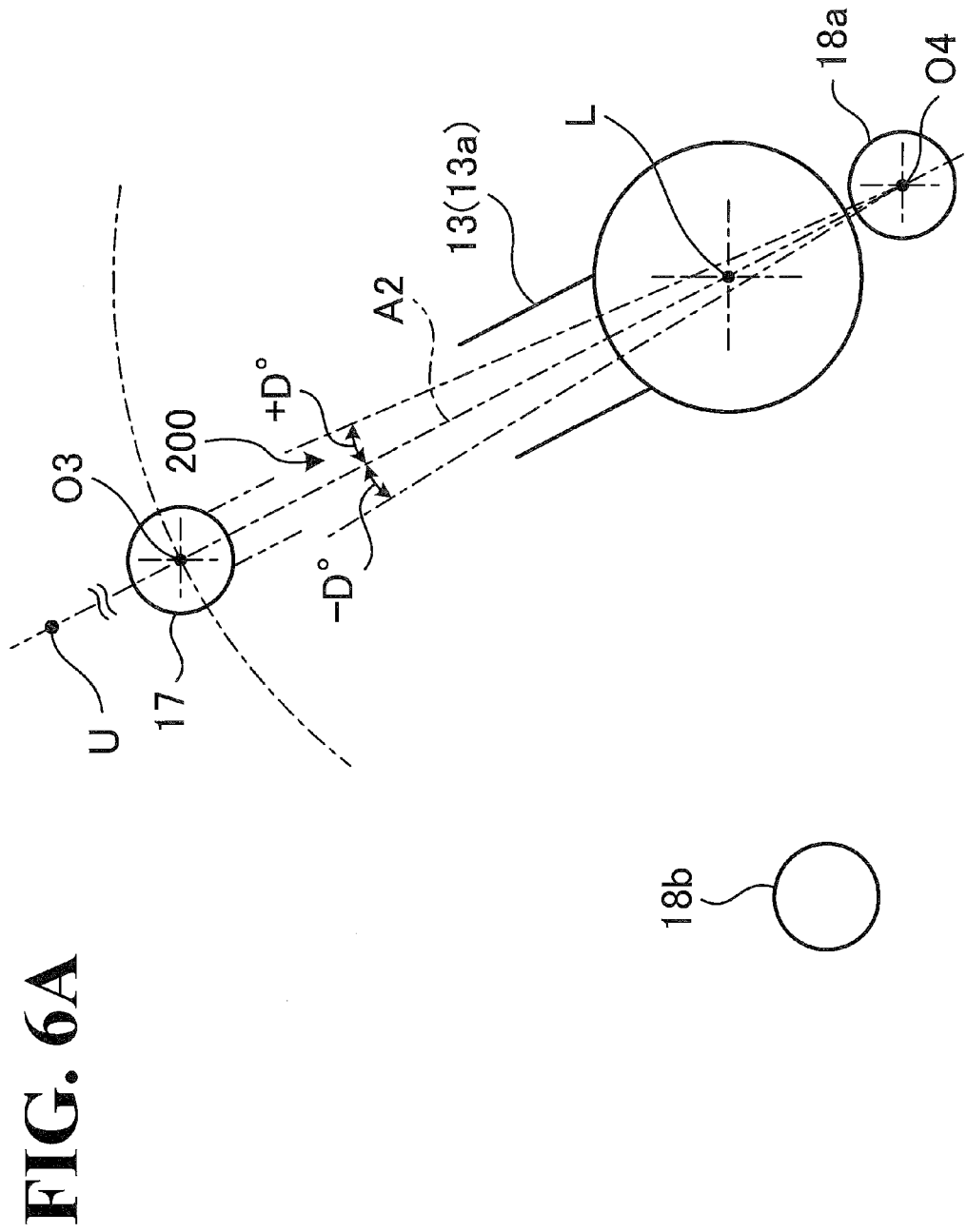
FIG. 6A illustrates a case where the jig is not operating properly.
Figure 6B:
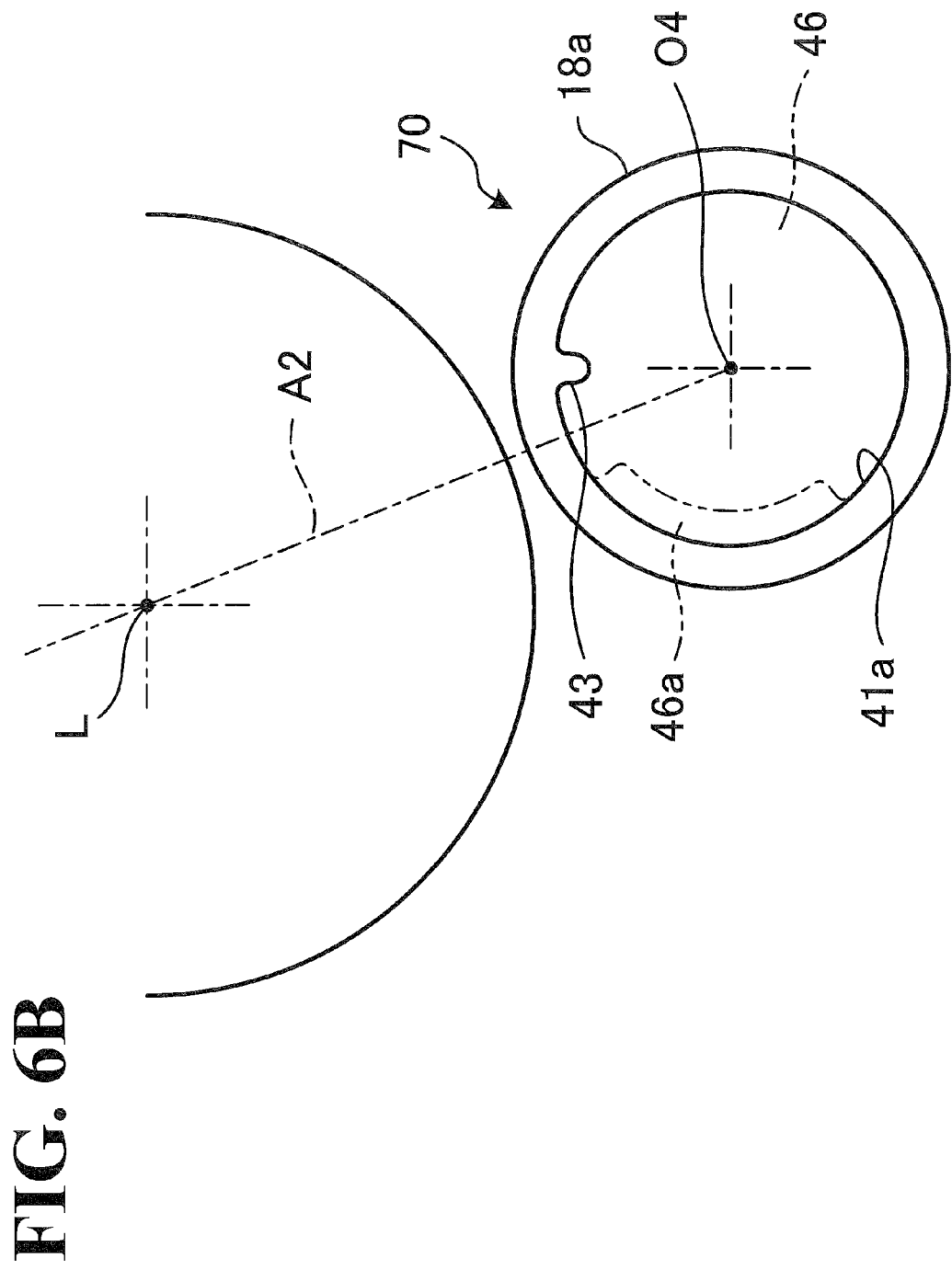
FIG. 6B is an enlarged view of the second attachment portion illustrated in FIG. 6A.

First, by referring to FIGS. 5A to 6B, description will be made with regard to how elements related to the restrictor 70 operate when the jig 20 is attached to the second attachment portion 18a. FIG. 5A illustrates a case where the jig is operating properly. FIG. 5B is an enlarged view of the second attachment portion illustrated in FIG. 5A. FIG. 6A illustrates a case where the jig is not operating properly. FIG. 6B is an enlarged view of the second attachment portion illustrated in FIG. 6A.

As illustrated in FIG. 5A, when the arm 13 is at such a posture that the turning axis L of the arm 13 and the axis line A2 of the jig 20 are away from each other, the jig 20 operates normally relative to the lower arm 13a. That is, the jig 20 provides a sufficient amount of tensile force to prevent the posture of the arm 13 from changing.

The axis line A2 of the jig 20 is a line connecting between the turning center O3 of the one end 21a of the jig 20 and the turning center O4 of the other end 21b of the jig 20. The turning center O3 and the turning center O4 are turning centers of the ends of the balancer 16, as well as being turning centers respectively of the one end 21a and the other end 21b of the jig 20.

When the arm is at such posture, the second attachment portion 18a is as illustrated in FIG. 5B. Specifically, the protrusion 46 is engaged with the depression 41a with the protrusion 43 of the restrictor 70 accommodated in the cutout 46a of the jig 20. That is, when the atm is at the posture illustrated in FIG. 5A, the other end 21b of the jig 20 is attachable to the second attachment portion 18a.

As illustrated in FIG. 6A, when the arm 13 is at a predetermined posture, that is, when the arm 13 is at such a posture that the turning axis L of the arm 13 and the axis line A2 of the jig 20 coincide, the jig 20 does not operate normally relative to the lower arm 13a. When the jig 20 is in the state illustrated in FIG. 6A, the tensile force of the jig 20 is degraded, and thus the jig 20 is unable to prevent the posture of the arm 13 from changing. Additionally, the jig 20 is unable to prevent the posture of the arm 13 from changing in the turning range 200. The turning range 200 ranges from the angle of the axis line A2 in this case to identical degrees in the front and rear directions (for example, an angle of +D° in the forward direction and an angle of −D° in the rear direction).

When the arm is at such posture, the second attachment portion 18a is as illustrated in FIG. 6B. Specifically, the jig 20 rotates by a predetermined angle about the turning center O4 in conjunction with the turning of the arm 13. This makes an attempt to attach the other end 21b of the jig 20 to the second attachment portion 18a unsuccessful because the protrusion 43 of the restrictor 70 and the cutout 46a at the jig 20 side do not match and the protrusion 46 is unable to engage with the depression 41a. Thus, when the arm is at the posture illustrated in FIG. 6A, the other end 21b of the jig 20 cannot be attached to the second attachment portion 18a.

Figure 7A:
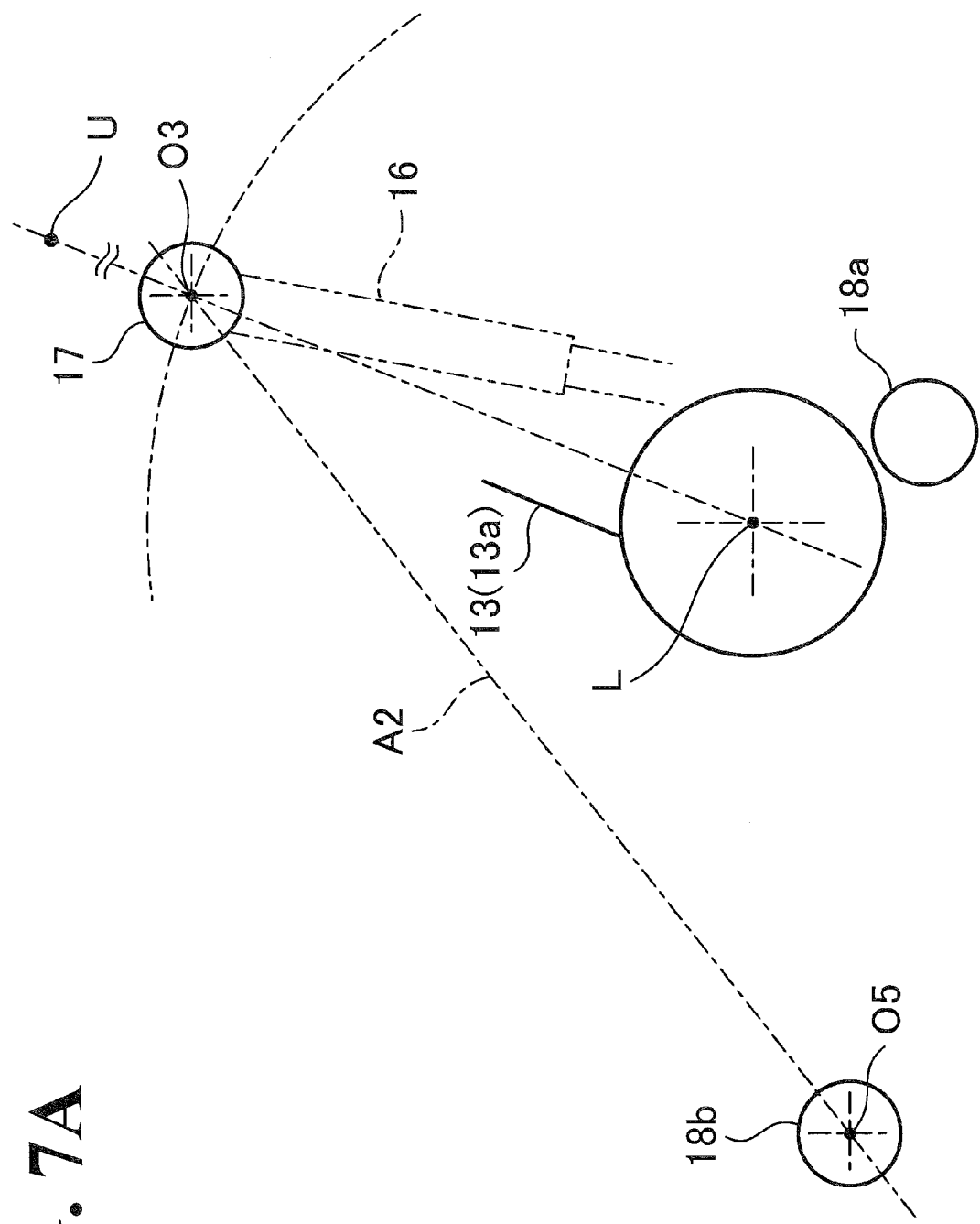
FIG. 7A illustrates a case where the jig is operating properly.
Figure 7B:
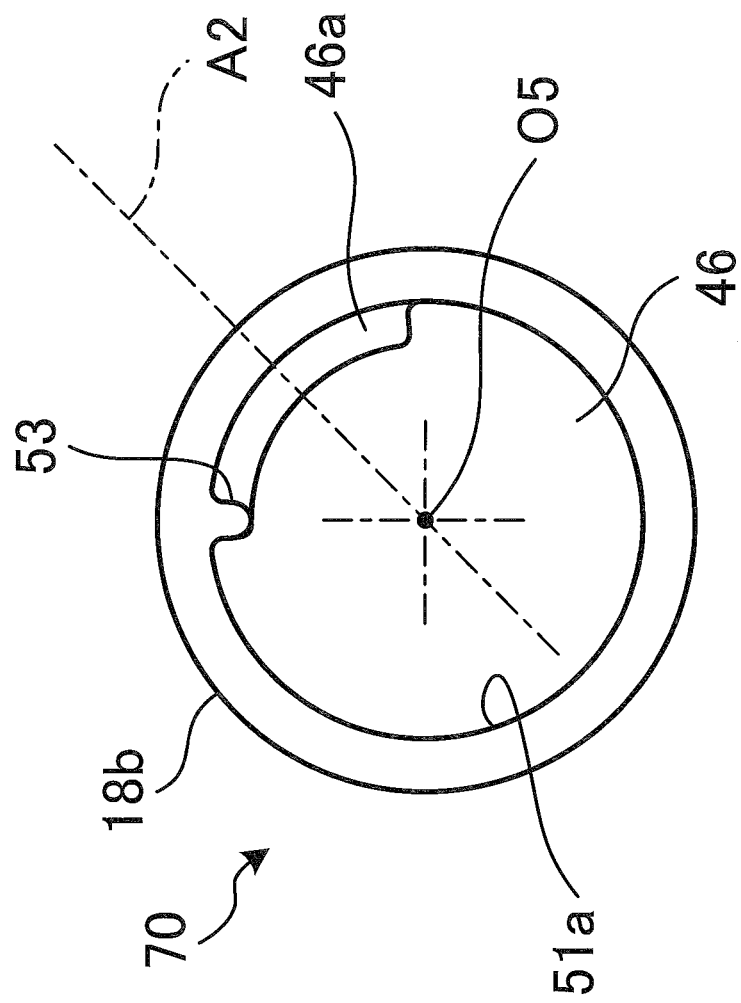
FIG. 7B is an enlarged view of another second attachment portion illustrated in FIG. 7A.
Figure 8A:
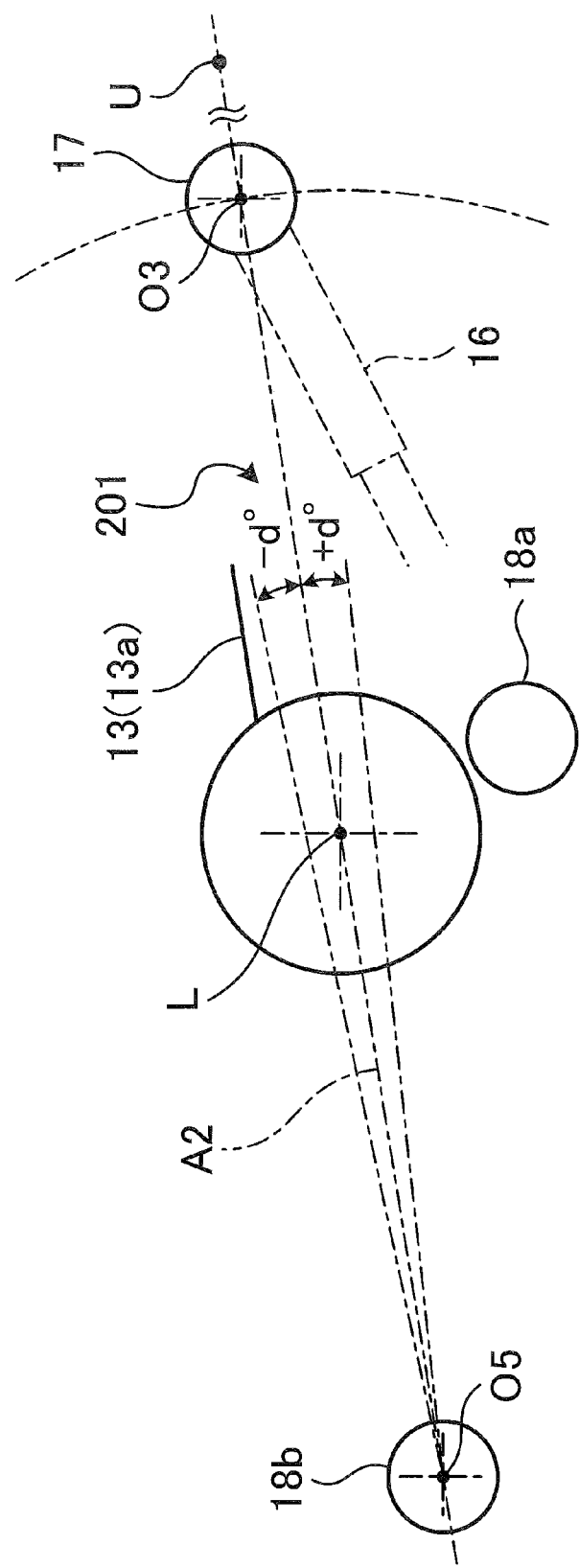
FIG. 8A illustrates a case where the jig is not operating properly.
Figure 8B:
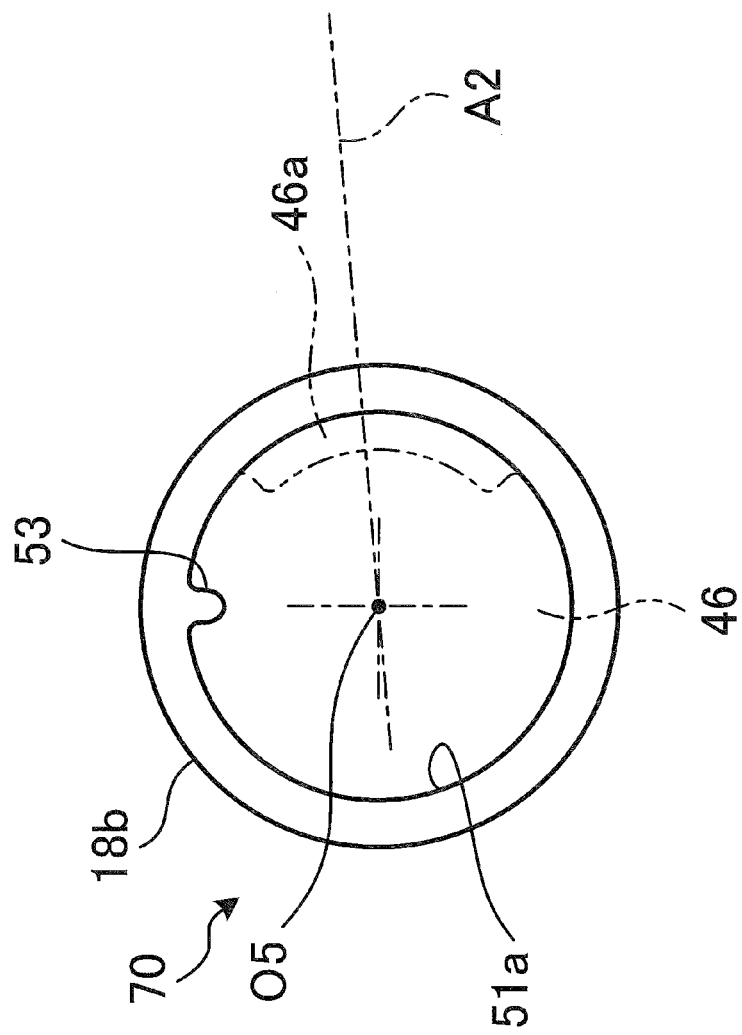
FIG. 8B is an enlarged view of the other second attachment portion illustrated in FIG. 8A.

Next, by referring to FIGS. 7A to 8B, description will be made with regard to how the elements related to the restrictor 70 operate when the jig 20 is attached to the other second attachment portion 18b. FIG. 7A illustrates a case where the jig is operating properly. FIG. 7B is an enlarged view of the other second attachment portion illustrated in FIG. 7A. FIG. 8A illustrates a case where the jig is not operating properly. FIG. 8B is an enlarged view of the other second attachment portion illustrated in FIG. 8A.

As illustrated in FIG. 7A, the other second attachment portion 18b is similar to the second attachment portion 18a. Specifically, when the arm 13 is at such a posture that the turning axis L of the arm 13 and the axis line A2 of the jig 20 are away from each other, the jig 20 operates normally relative to the lower arm 13a. That is, the jig 20 provides a sufficient amount of tensile force to prevent the posture of the arm 13 from changing.

The axis line A2 of the jig 20 is a line connecting between the turning center O3 of the one end 21a of the jig 20 and the turning center O5 of the other end 21b of the jig 20.

Then, when the arm is at such posture, the other second attachment portion 18b is as illustrated in FIG. 7B. Specifically, the protrusion 46 is engaged with the depression 51a with the protrusion 53 of the restrictor 70 accommodated in the cutout 46a of the jig 20. That is, when the arm is at the posture illustrated in FIG. 7A, the other end 21b of the jig 20 is attachable to the other second attachment portion 18b.

As illustrated in FIG. 8A, when the arm 13 is at a predetermined posture, that is, when the arm 13 is at such a posture that the turning axis L of the arm 13 and the axis line A2 of the jig 20 coincide, the jig 20 does not operate normally relative to the lower arm 13a. When the jig 20 is in the state illustrated in FIG. 8A, the tensile force of the jig 20 is degraded, and thus the jig 20 is unable to prevent the posture of the arm 13 from changing. Additionally, the jig 20 is unable to prevent the posture of the arm 13 from changing in a turning range 201. The turning range 201 ranges from the angle of the axis line A2 in this case to identical degrees in the front and rear directions (for example, an angle of +d° in the forward direction and an angle of −d° in the rear direction).

When the arm is at such posture, the second attachment portion 18b is as illustrated in FIG. 8B. Specifically, the jig 20 rotates by a predetermined angle about the turning center O5 in conjunction with the turning of the arm 13. This makes an attempt to attach the other end 21b of the jig 20 to the other second attachment portion 18b unsuccessful because the protrusion 53 of the restrictor 70 and the cutout 46a at the jig 20 side do not match and the protrusion 46 is unable to engage with the depression 51a. Thus, when the arm is at the posture illustrated in FIG. 8A, the other end 21b of the jig 20 cannot be attached to the other second attachment portion 18b.

Thus, the two second attachment portions 18a and 18b are different from each other in the predetermined posture of the arm 13 that makes the jig 20 unattachable. Hence, when the jig 20 is unattachable to one of the two second attachment portions 18a and 18b, the jig 20 is attachable to the other one of the two second attachment portions 18a and 18b. Specifically, when the arm 13 is at a predetermined posture, the restrictor 70 restricts attachability of the jig 20 to one second attachment portion among the two second attachment portions 18a and 18b.

Also the restrictor 70 uses the cutout 46a to set the turnable range of the other end 21b of the jig 20 attached to the second attachment portion 18a and the turnable range of the other end 21b of the jig 20 attached to the second attachment portion 18b. This ensures such an exemplary manner of setting that the jig 20 is attachable to one second attachment portion 18 (the second attachment portion 18a) when the arm 13 is in one sub-range of the turnable range of the arm 13, while when the arm 13 is anywhere in the rest of the turnable range, the jig 20 is attachable to the other second attachment portion 18b.

Figure 9:
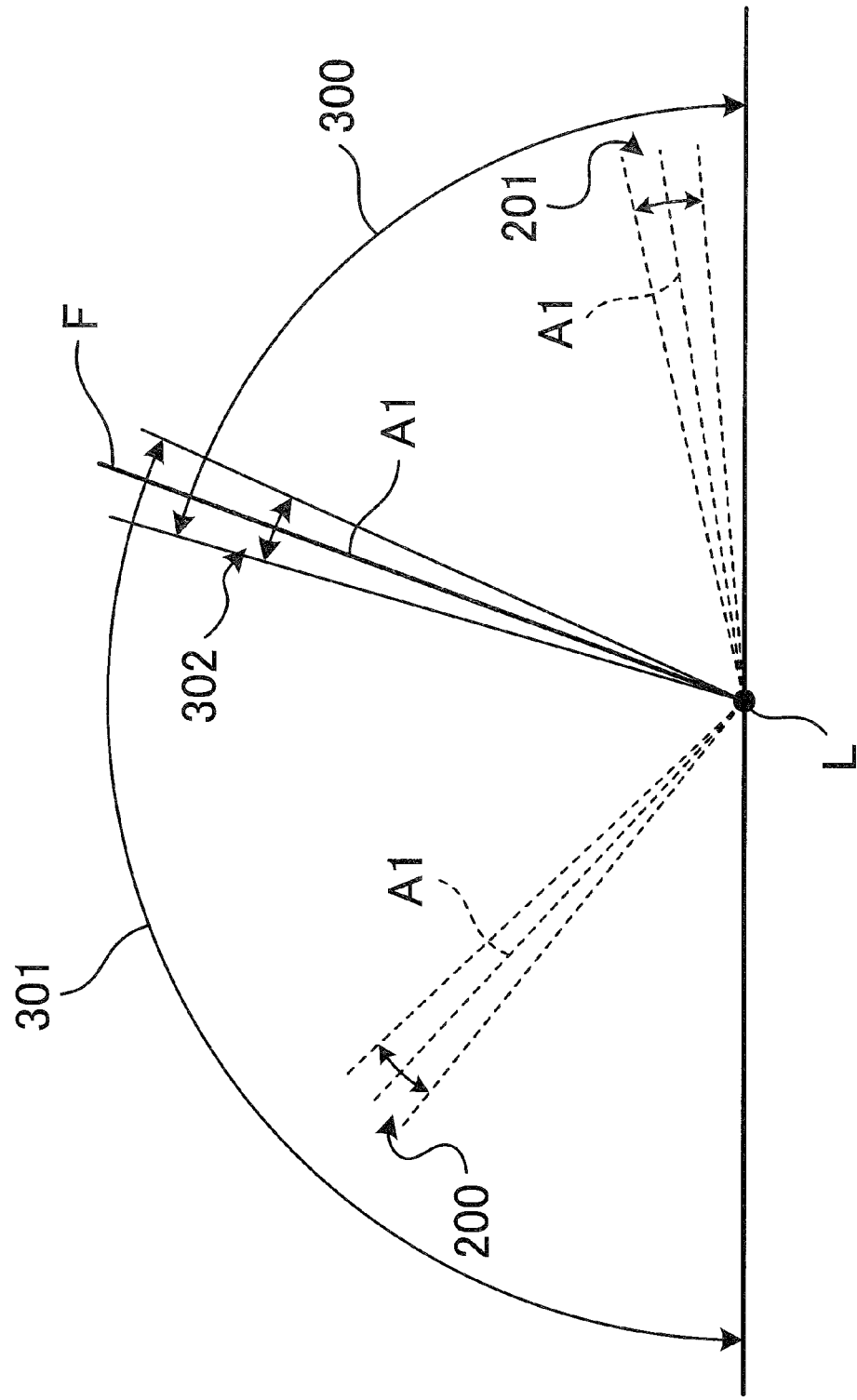
FIG. 9 illustrates how to make a setting in attaching the jig in the robot according to the embodiment.

Description will be made below with regard to how the restrictor 70 makes a setting in attaching the jig 20 in accordance with the posture of the arm 13 in the robot 10 according to this embodiment. FIG. 9 illustrates how to make a setting in attaching the jig 20 in the robot 10. FIG. 9 is under the assumption that the arm 13 is turnable about the turning axis L in the range of approximately 0° to 180°. Also in FIG. 9, the arm 13 is indicated by an axis line A1.

As illustrated in FIG. 9, when the arm (axis line A1) is in a turning range 300 in the turnable range of the arm, the attachability of the jig is set to one of the second attachment portions. The turning range 300 is at the front side relative to a reference posture F. When the arm (axis line A1) is in a turning range 301, the attachability of the jig is set to the other second attachment portion. The turning range 301 is at the rear side relative to the reference posture F.

Here, the turning range 300 contains the turning range 201, in which the jig cannot be attached to the other second attachment portion. Hence, when the arm (axis line A1) is in the turning range 300, the jig cannot be attached to the other second attachment portion. Similarly, the turning range 301 contains the turning range 200, in which the jig cannot be attached to the one second attachment portion. Hence, when the arm (axis line A1) is in the turning range 301, the jig cannot be attached to the one second attachment portion.

Setting the attachment of the jig to the two second attachment portions in this manner reliably eliminates or minimizes erroneous attachment of the jig to a second attachment portion to which the jig is unattachable.

In the exemplary manner of setting illustrated in FIG. 9, the attachability of the jig is set to both the two second attachment portions in a turning range 302. The turning range 302 ranges from the reference posture F of the arm to predetermined degrees in the front and rear directions. This provides such an exemplary advantageous effect that when the arm is at the reference posture F, the jig can be attached to any one of the two second attachment portions. That is, it is not necessary to precisely design the protrusions 43 and 53 and the cutout 46a illustrated in FIGS. 4A and 4B.

The robot 10 according to this embodiment has a choice between the two second attachment portions 18a and 18b in accordance with the posture of the arm 13. For example, when the arm 13 is at such a posture that the jig 20 attached to the second attachment portion 18a is inoperable to the arm 13 (lower arm 13a), the jig 20 is attached to the other second attachment portion 18b. In this case, the arm 13 is not at the predetermined posture relative to the second attachment portion 18b. This prevents the arm 13 from taking the predetermined posture, resulting in safe maintenance.

In the robot 10 according to this embodiment, one second attachment portion 18 (the second attachment portion 18a) is disposed at the coupling portion where the balancer 16 and the rotation base 12 are coupled to each other. This facilitates the determination as to whether the arm 13 is at a predetermined posture (posture at which the jig 20 is inoperable to the lower arm 13a).

Also in the robot 10 according to this embodiment, the restrictor 70 restricts attachability of the jig 20 to one second attachment portion among the plurality of second attachment portions 18 when the arm 13 is at a predetermined posture. This eliminates or minimizes erroneous attachment of the jig 20.

Also in the robot 10 according to this embodiment, the restrictor 70 at the second attachment portions 18a and 18b uses the protrusions 43 and 53 and the cutout 46a to mechanically restrict attachment of the jig 20. This reliably eliminates or minimizes erroneous attachment of the jig 20 with a simple configuration.

Also in the robot 10 according to this embodiment, the cutout 46a, which implements the restricting function, is disposed over a predetermined phase range of the protrusion 46. This enables the restrictor 70 to set a restricted range and an unrestricted range.

Also in the robot 10 according to this embodiment, the jig 20 includes the adjustor 60 to adjust the length of the jig 20. This ensures use of a common jig 20 for the two second attachment portions 18a and 18b even though the two second attachment portions 18a and 18b have different distances to the first attachment portion 17.

As illustrated in FIG. 9, the robot 10 according to this embodiment sets different ranges of attachability to the second attachment portions 18a and 18. This, however, should not be construed in a limiting sense. Another possible example is that the jig 20 is normally attached to one second attachment portion 18 (for example, the second attachment portion 18a), and attached to the other second attachment portion 18b in a range in which the jig is unattachable to the second attachment portion 18a.

Figure 10:
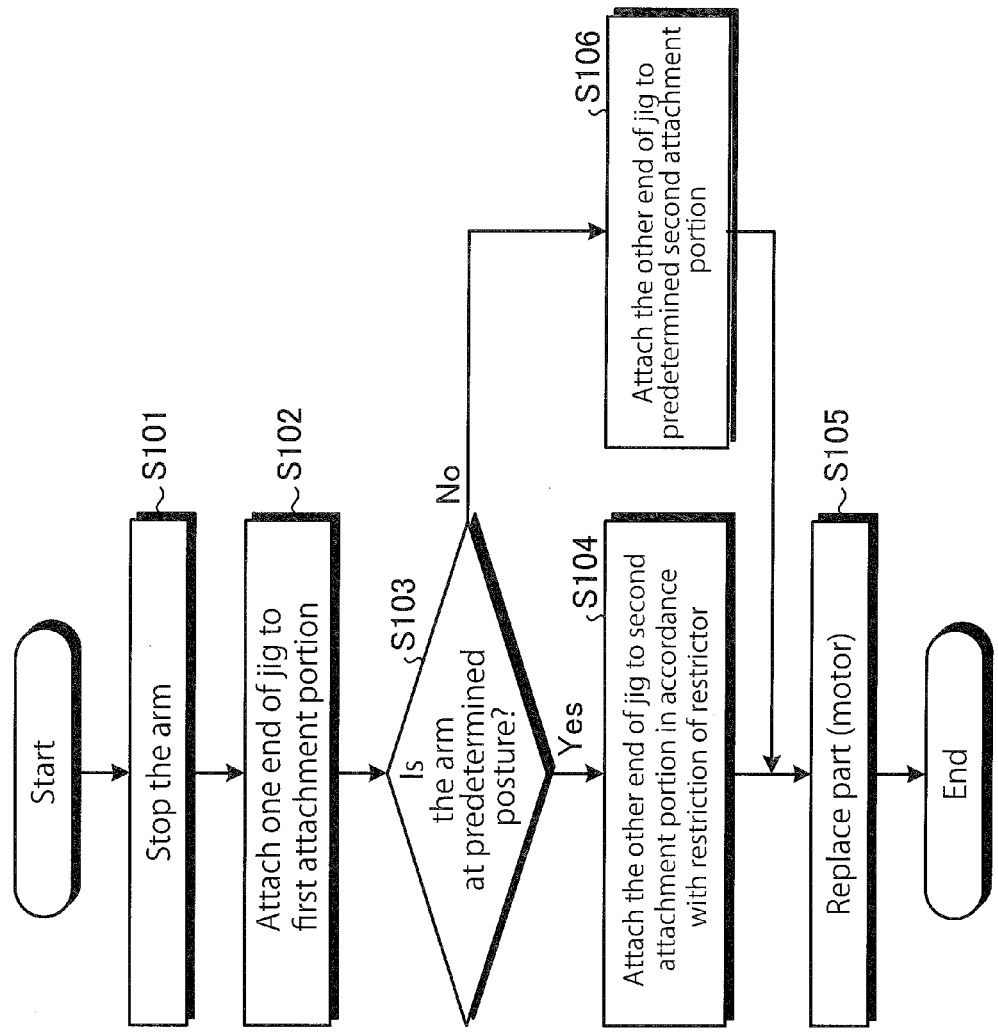
FIG. 10 is a flowchart of a processing procedure for a maintenance method for the robot according to the embodiment.

Next, by referring to FIG. 10, a maintenance method for the robot 10 according to this embodiment will be described. FIG. 10 is a flowchart of a processing procedure for the maintenance method for the robot 10 according to this embodiment. The following description will also refer to FIG. 1.

As illustrated in FIGS. 1 and 10, in the maintenance of the robot 10, the arm 13 is first stopped (step S101). Here, the arm 13 stops at any posture relative to the rotation base 12. Specifically, the posture of the arm 13 in this case refers to the posture of the lower arm 13a relative to the rotation base 12.

When the arm 13 stops, one end of the jig is attached to the first attachment portion 17 so as to restrict displacement of the balancer 16 in the axial direction (step S102).

Next, a determination is made as to whether the arm 13 is at a predetermined posture (step S103). The predetermined posture of the arm 13 refers to such a posture of the arm 13 that the arm 13, the balancer 16, and the jig are arranged to make the turning axis L of the arm 13 meet the line connecting between the turning center O3 of one end of the jig and the turning center O4 of the other end of the jig. When the arm 13 is at the predetermined posture, the jig is inoperable to the lower arm 13a and thus the tensile force of the jig is degraded. Thus, when the arm 13 is at the predetermined posture, the posture of the arm 13 cannot be prevented from changing even though the jig is attached.

When the determination made at step S103 is that the arm 13 is at the predetermined posture (step S103, Yes), the restrictor restricts attachability of the jig to one second attachment portion 18 (for example, the second attachment portion 18b) among a plurality of (two in this embodiment) second attachment portions 18, and the other end of the jig is attached to the second attachment portion 18b (step S104).

Then, a part such as the servo motor is replaced (step S105). In the meantime, the jig is operating properly relative to the lower arm 13a, which eliminates or minimizes the possibility of the arm 13 falling. This ensures safety in removing a part to be replaced from the robot 10 even if the part is the servo motor or a similar element that has a locking function to maintain the posture of the arm 13.

When the determination made at step S103 is that the arm 13 is not at the predetermined posture (step S103, No), the other end of the jig is attached to a predetermined second attachment portion 18 (for example, the second attachment portion 18a) (step S106). In this case, the posture of the arm 13 does not change. Then, a part such as the servo motor is replaced (step S105).

In the maintenance method for the robot 10 according to this embodiment, when the arm 13 is at the predetermined posture, attachability is restricted by the restrictor to one second attachment portion 18 among the two the second attachment portions 18 (18a and 18b). This reliably eliminates or minimizes erroneous attachment of the jig.

In the maintenance method for the robot 10 according to this embodiment, the first attachment portion 17 is prioritized in the attachment. This, however, should not be construed in a limiting sense. The second attachment portion 18 may be first in the attachment. In this case, the determination as to whether the arm 13 is at the predetermined posture is made prior to the attachment to the second attachment portion 18.

The maintenance method for the robot 10 according to this embodiment is under the assumption that an operator or another worker performs the maintenance. The operator or another worker, however, should not be construed in a limiting sense. Another possible example is another robot to perform the above-described procedure.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by letters patent of the United States is:

1. A robot comprising:
   a base;
   a rotation base coupled to the base and rotatable about a predetermined rotation axis relative to the base;
   an arm comprising a base end that is coupled to the rotation base and that is turnable relative to the rotation base about a turning axis that is approximately perpendicular to the predetermined rotation axis;
   a balancer coupled to the rotation base and the arm to provide force to between the rotation base and the arm;
   a first attachment portion to which one end of a jig is attachable to restrict displacement of the balancer in an axial direction, the first attachment portion being disposed at a coupling portion where the balancer and the arm are coupled to each other; and
   a plurality of second attachment portions to which another end of the jig is attachable, the plurality of second attachment portions being disposed at a predetermined distance from the rotation base, the plurality of second attachment portions comprising a restrictor configured to restrict attachment of the other end of the jig to one second attachment portion among the plurality of second attachment portions when the arm is at a predetermined posture.

2. The robot according to claim 1, wherein at least one second attachment portion among the plurality of second attachment portions is disposed at a coupling portion where the balancer and the rotation base are coupled to each other.

3. The robot according to claim 2, wherein the jig comprises an adjustor configured to adjust a length between the one end and the other end of the jig in accordance with a distance between the first attachment portion and at least one second attachment portion among the plurality of second attachment portions.

4. The robot according to claim 1,
wherein the restrictor comprises at least one of a first protrusion and a first cutout at a predetermined position on a surface of the restrictor that is to come into contact with the jig, and
wherein the jig comprises at least one of a second protrusion and a second cutout at a predetermined position on a surface of the jig that is to come into contact with the restrictor.

5. The robot according to claim 4,
wherein the first protrusion and the second protrusion are each disposed at a predetermined phase on a circular depression, and
wherein the first cutout and the second cutout are each disposed over a predetermined phase range on a circular protrusion that is to be engaged with the depression.

6. The robot according to claim 4, wherein the jig comprises an adjustor configured to adjust a length between the one end and the other end of the jig in accordance with a distance between the first attachment portion and at least one second attachment portion among the plurality of second attachment portions.

7. The robot according to claim 5, wherein the jig comprises an adjustor configured to adjust a length between the one end and the other end of the jig in accordance with a distance between the first attachment portion and at least one second attachment portion among the plurality of second attachment portions.

8. The robot according to claim 1, wherein the jig comprises an adjustor configured to adjust a length between the one end and the other end of the jig in accordance with a distance between the first attachment portion and at least one second attachment portion among the plurality of second attachment portions.

9. A maintenance method for a robot, the robot comprising:
a base;
a rotation base coupled to the base and rotatable about a predetermined rotation axis relative to the base;
an arm comprising a base end that is coupled to the rotation base and that is turnable relative to the rotation base about a turning axis that is approximately perpendicular to the predetermined rotation axis;
a balancer coupled to the rotation base and the arm to provide force to between the rotation base and the arm;
a first attachment portion to which one end of a jig is attachable to restrict displacement of the balancer in an axial direction, the first attachment portion being disposed at a coupling portion where the balancer and the arm are coupled to each other; and
a plurality of second attachment portions to which another end of the jig is attachable, the plurality of second attachment portions being disposed at a predetermined distance from the rotation base, the plurality of second attachment portions comprising a restrictor configured to restrict attachment of the other end of the jig to one second attachment portion among the plurality of second attachment portions when the arm is at a predetermined posture,
the method comprising:
stopping the arm with the arm at the predetermined posture;
attaching the jig to the first attachment portion and to at least one second attachment portion among the plurality of second attachment portions to which the jig is attachable; and
replacing a part of the robot.

10. A robot comprising:
a base;
a rotation base coupled to the base and rotatable about a predetermined rotation axis relative to the base;
an arm comprising a base end that is coupled to the rotation base and that is turnable relative to the rotation base about a turning axis that is approximately perpendicular to the predetermined rotation axis;
a balancer coupled to the rotation base and the arm to provide force to between the rotation base and the arm;
a first attachment portion to which one end of a jig is attachable to restrict displacement of the balancer in an axial direction, the first attachment portion being disposed at a coupling portion where the balancer and the arm are coupled to each other; and
a plurality of second attachment portions to which another end of the jig is attachable, the plurality of second attachment portions being disposed at a predetermined distance from the rotation base,
wherein the jig comprises an adjustor configured to adjust a length between the one end and the other end of the jig in accordance with a distance between the first attachment portion and at least one second attachment portion among the plurality of second attachment portions.

* * * * *